(12) United States Patent
Lee et al.

(10) Patent No.: US 11,176,117 B2
(45) Date of Patent: Nov. 16, 2021

(54) AUTOMATED DETECTION OF ERRORS IN LOCATION DATA IN AGRICULTURAL OPERATIONS

(71) Applicant: The Climate Corporation, San Francisco, CA (US)

(72) Inventors: Wayne Tai Lee, St. Louis, MO (US); Markus Huber, San Francisco, CA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 231 days.

(21) Appl. No.: 16/424,191

(22) Filed: May 28, 2019

(65) Prior Publication Data
US 2020/0201839 A1    Jun. 25, 2020

Related U.S. Application Data

(60) Provisional application No. 62/783,872, filed on Dec. 21, 2018.

(51) Int. Cl.
*G06F 16/23* (2019.01)
*G06T 11/00* (2006.01)

(52) U.S. Cl.
CPC ........ *G06F 16/2365* (2019.01); *G06T 11/001* (2013.01)

(58) Field of Classification Search
None
See application file for complete search history.

(56) References Cited

U.S. PATENT DOCUMENTS

| 10,477,756 | B1* | 11/2019 | Richt | G06Q 50/02 |
|---|---|---|---|---|
| 2006/0237200 | A1* | 10/2006 | Unruh | A01B 69/004 172/2 |
| 2008/0167049 | A1* | 7/2008 | Karr | G01S 5/0278 455/456.2 |
| 2018/0020329 | A1* | 1/2018 | Smith | H04W 4/026 |
| 2019/0162855 | A1* | 5/2019 | McPeek | A01G 22/00 |

* cited by examiner

*Primary Examiner* — Irene Baker
(74) *Attorney, Agent, or Firm* — Hickman Becker Bingham Ledesma LLP

(57) ABSTRACT

In an embodiment, a server computer receives, over a digital communication network, agricultural data records comprising a plurality of planting and harvesting data values. Each of the planting and harvesting data values include geo-location coordinates and corresponding timestamps. The server generates a plurality of planting datasets by aggregating planting data values based on geo-location coordinates and timestamps. The server generates a plurality of harvesting datasets by aggregating harvesting data values based on geo-location coordinates and timestamps. The server determines a dataset of planting-to-harvesting matching pairs based upon nearest proximities between geo-location coordinates of planting datasets and geo-location coordinates of harvesting datasets. The server determines geo-location error values representing offsets of between geo-locations of corresponding planting-to-harvesting matching pairs. The server presents the geo-location error values on a display screen of a client computer.

21 Claims, 13 Drawing Sheets

Fig. 2
(a)
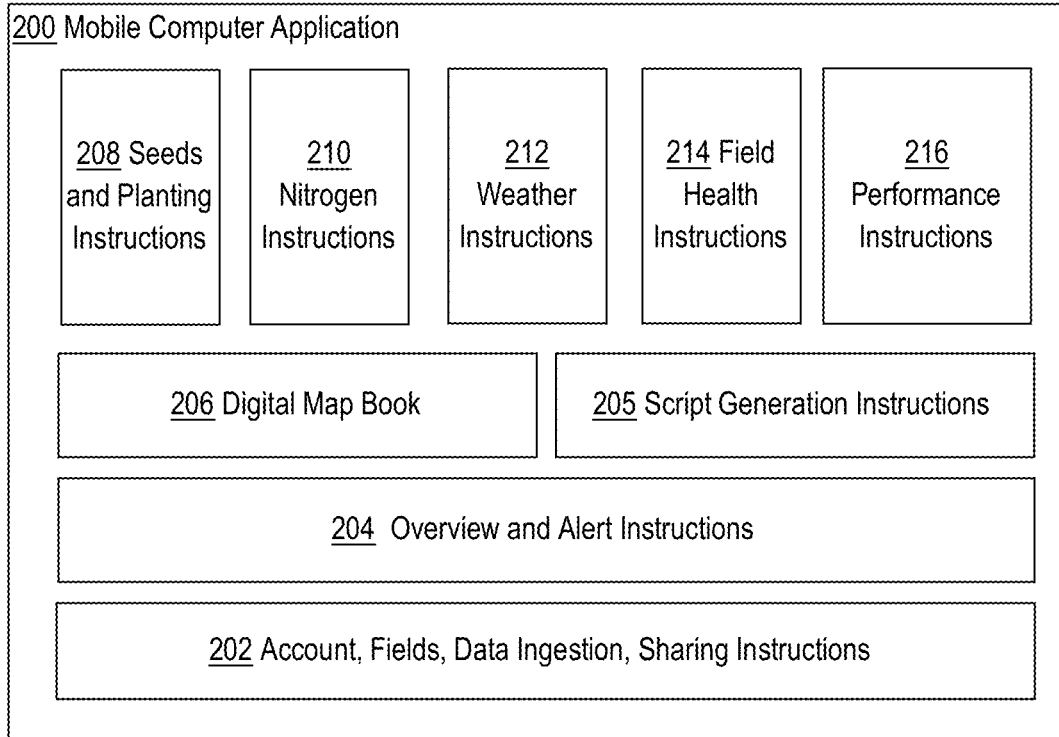
(b)
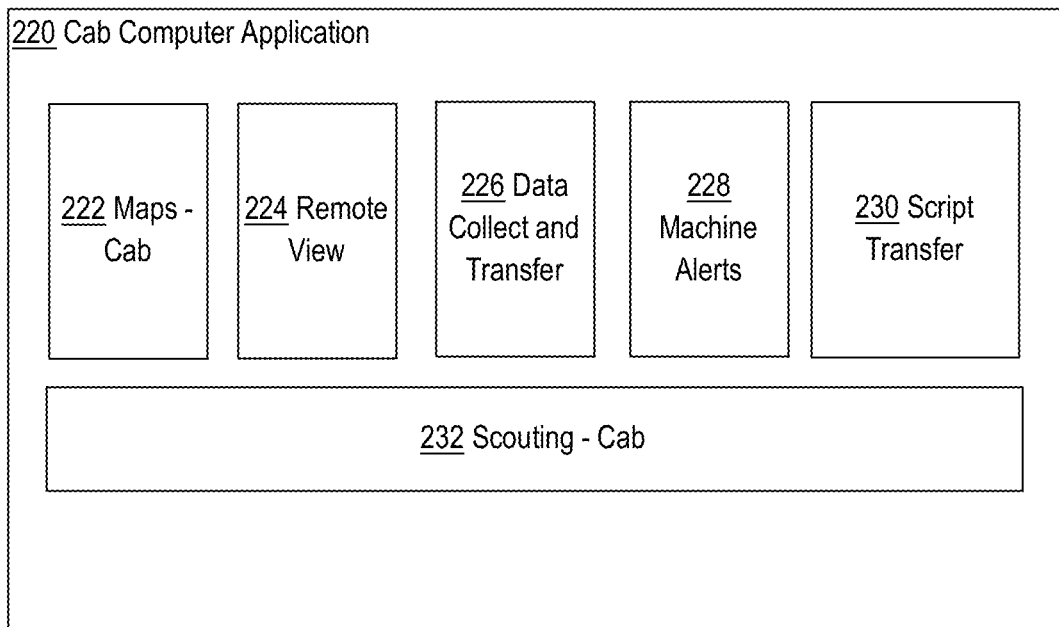

Data Manager

[ Nitrogen | Planting | Practices | Soil ]

Planting 1 (4 Fields)
Crop Corn Product
Plant Date: 2016-04-12
ILU 112 | Pop: 34000
[ Edit ] [ Apply ]

Planting 2 (0 Fields)
Crop Corn Product
Plant Date: 2016-04-15
ILU 83 | Pop: 34000
[ Edit ] [ Apply ]

Planting 3 (0 Fields)
Crop Corn Product
Plant Date: 2016-04-13
ILU 83 | Pop: 34000
[ Edit ] [ Apply ]

Planting 4 (1 Fields)
Crop Corn Product
Plant Date: 2016-04-13
ILU 112 | Pop: 34000
[ Edit ] [ Apply ]

[ + Add New Planting Plan ]

| | CROP | PLANTED ACRES | PRODUCT | RELATIVE MATURITY | TARGET YIELD | POPULATION (AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

905 Aggregate sets of planting data values based on corresponding timestamps to generate the planting datasets

910 Normalize the sets of planting data values of the planting datasets by applying at least one of a heading direction rotation adjustment, a geo-location shift adjustment, and applying measurable unit values

915 Assign unique planting pass identifiers to each of the planting datasets

920 Aggregate sets of harvesting data values based on corresponding timestamps to generate the harvesting datasets

925 Normalize the sets of harvesting data values of the harvesting datasets by applying at least one of a heading direction rotation adjustment, a geo-location shift adjustment, and applying measurable unit values

930 Assign unique harvesting pass identifiers to each of the harvesting datasets

FIG. 12

Records with coverage less than 60%

1205

[redacted text block primarily consisting of asterisks with some xxxxx characters near the bottom]

Records with coverage less than 90%

1220

[redacted text block with mixed asterisks and xxxxx character sequences throughout]

AUTOMATED DETECTION OF ERRORS IN LOCATION DATA IN AGRICULTURAL OPERATIONS

CROSS REFERENCE TO RELATED APPLICATIONS, BENEFIT CLAIM

This application claims the benefit of provisional application 62/783,872, filed Dec. 21, 2018, the entire contents of which is hereby incorporated by reference as if fully set forth herein, under 35 U.S.C. § 119(e).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2019 The Climate Corporation.

FIELD OF THE DISCLOSURE

One technical field of the present disclosure is computer-implemented error detection and/or error correction in digital datasets. Another technical field is computer-aided analysis of geo-location data associated with agricultural field operations such as planting and harvesting.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The analysis of various types of field data, such as planting data and harvest data, depends on the accurate measurement of locations of agricultural apparatus such as planters and harvesters or combines, which is typically obtained using Global Positioning System (GPS) receivers mounted on the apparatus. Data in the form of GPS latitude-longitude (lat-long) value pairs, and other metadata, is collected as the apparatus traverses the field. GPS location data is associated with each measurement point in a field, such as a start point or endpoint of a pass of a planter in the field. The GPS data allows matching field locations across different data layers that are obtained at different times during the planting season. Accurate correlation of these different datasets, based on geo-location, is crucial to derive accurate calculations of yield or other performance factors.

However, poor GPS signal quality can result in inaccurate position values. These errors propagate into field measurements and therefore matching data layers becomes inaccurate. For example, an error in GPS data could result in correlating a yield value to the wrong treatment plan or location. Because of the volume of data collected in this manner, automated processes of error detection and/or correction are needed to enable more accurate calculation of agricultural data. And, merely detecting error values and generating visual or textual reports about error magnitude can assist growers in adjusting equipment or GPS receivers or in interpreting data that is calculated on the basis of GPS values.

One approach to error detection is direct measurement of the signal quality of GPS satellite transmissions, at individual receivers, if the original GPS data stream is available. Signal quality may be measured, for example, by determining the number of GPS satellites to which a particular receiver established connections; typically, this number is in the range of three to eight. However, original GPS data streams typically are not available or is impractical to store for a large number of fields, field operations such as planting and harvesting, and seasons.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 9 illustrates an example embodiment of processing agricultural data records and determining planting datasets and harvesting datasets using agricultural equipment passes.

FIG. 12 illustrates embodiments of graphical interfaces presented on a client computer that graphically display the geo-location error values within a field.

DETAILED DESCRIPTION

Figure 1:
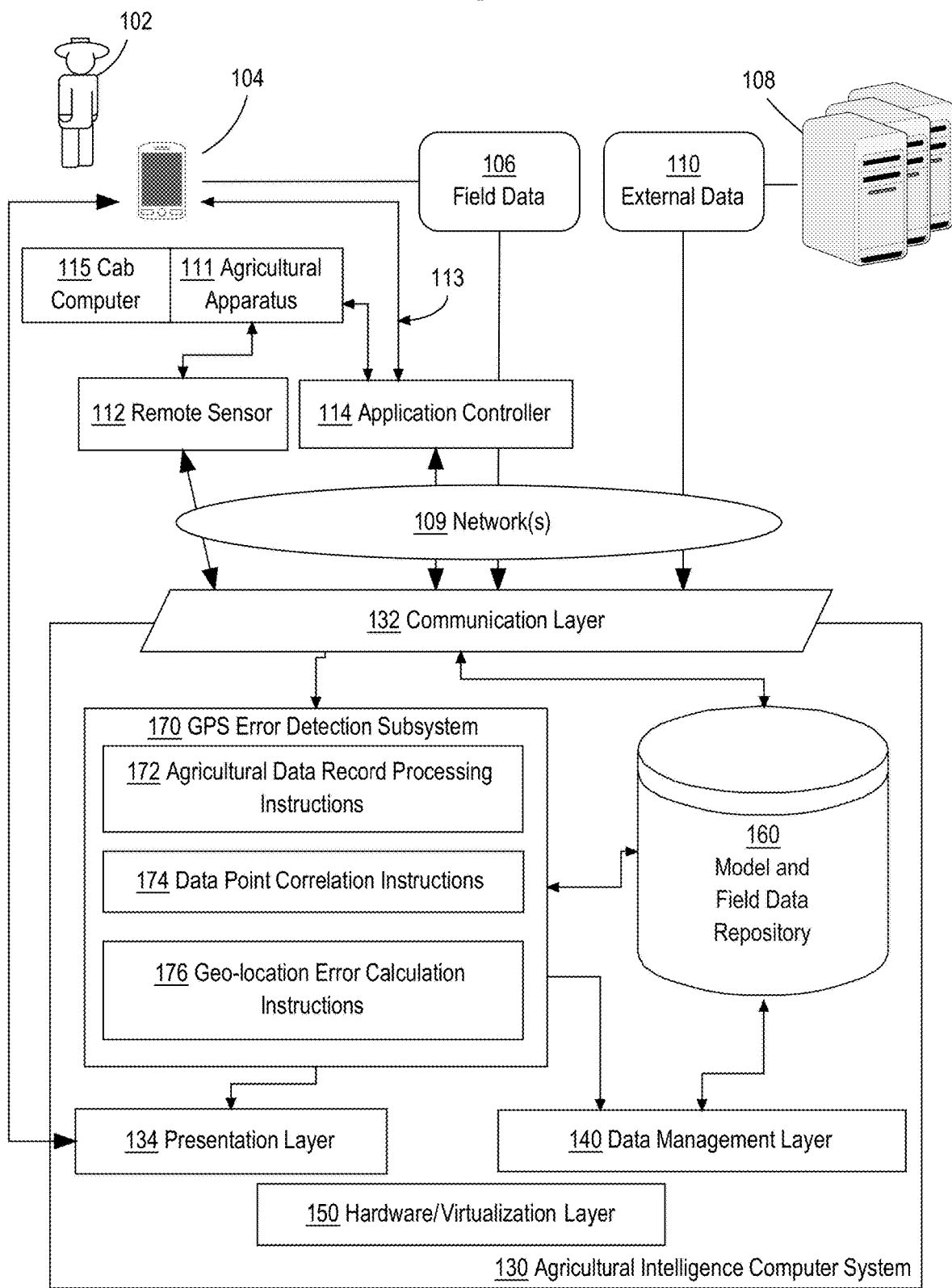
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. GPS ERROR DETECTION SUBSYSTEM
   2.6. IMPLEMENTATION EXAMPLE—HARDWARE OVERVIEW
3. FUNCTIONAL OVERVIEW—GPS ERROR DETECTION
   3.1. GPS ERROR DETECTION—CORRELATING EQUIPMENT PASSES
      3.1.1. RECEIVING AGRICULTURAL DATA RECORDS
      3.1.2. PROCESSING AGRICULTURAL DATA RECORDS
      3.1.3. DETERMINE MATCHING PLANTING PASS AND HARVESTING PASS PAIRS
      3.1.4. CALCULATING GPS ERROR VALUES
      3.1.5. PRESENTING GPS ERROR VALUES
   3.2. GPS ERROR DETECTION—ITERATIVE APPROACH
      3.2.1. RECEIVING AGRICULTURAL DATA RECORDS
      3.2.2. PROCESSING AGRICULTURAL DATA RECORDS
      3.2.3. DETERMINE MATCHES PLANTING DATASETS
      3.2.4. CALCULATING GPS ERROR VALUES
      3.2.5. PRESENTING GPS ERROR VALUES
4. EXTENSIONS AND ALTERNATIVES

1. General Overview

Computer systems and computer-implemented methods for detecting errors in global positioning system (GPS) data from agricultural apparatus are disclosed. In an embodiment, a server computer system may receive, over a digital data communication network a plurality of planting data values and a plurality of harvesting data values. The planting data values may include geo-location coordinates, such as GPS latitude-longitude values, and timestamps representing the dates and times of observed planting data values. The harvesting data values may include geo-location coordinates, and timestamps representing the dates and times of observed harvesting data values. The server computer system may generate a plurality of planting datasets and a plurality of harvesting datasets by aggregating planting data values and aggregating harvesting data values based upon geo-location coordinates and timestamps associated with each of the planting data values and the harvesting data values, respectively.

The server computer system may determine a dataset of planting-to-harvesting pairs that represent matching pairs of planting datasets to corresponding harvesting datasets based upon proximities between geo-location coordinates associated with each of the planting datasets and the harvesting datasets, respectively. The server computer system may determine geo-location error values for each of the planting-to-harvesting pairs of the dataset of planting-to-harvesting pairs by determining geo-location offset values between corresponding geo-locations of each of the planting-to-harvesting pairs. The server computer system may present the geo-location error values on a display screen of a client computer.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
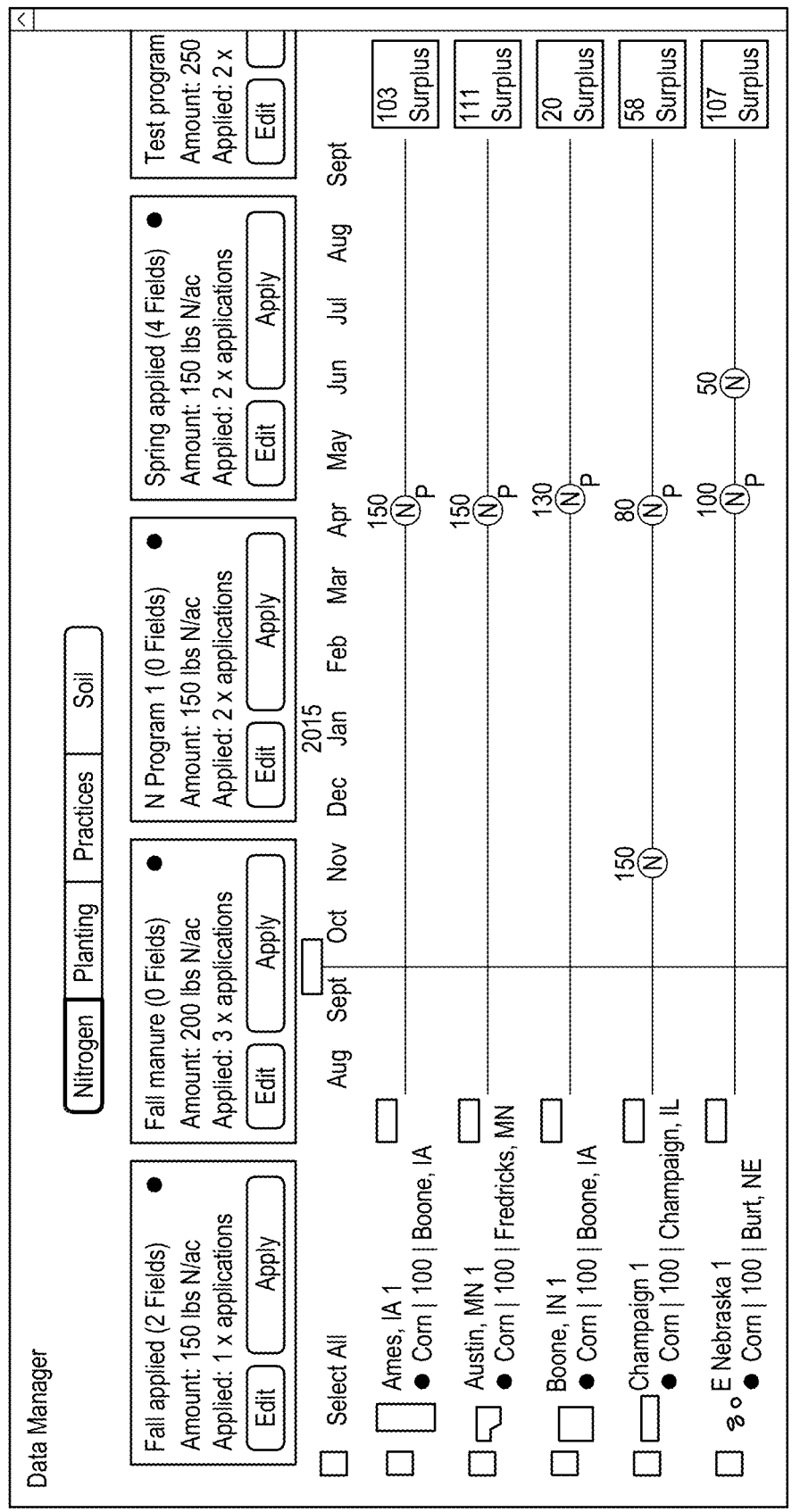
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, GPS error detection subsystem 170, and each of its components, comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, agricultural data record processing instructions 172 may comprise a set of pages in RAM that contain instructions which when executed cause performing the target identification functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each component of a GPS error detection subsystem 170 may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
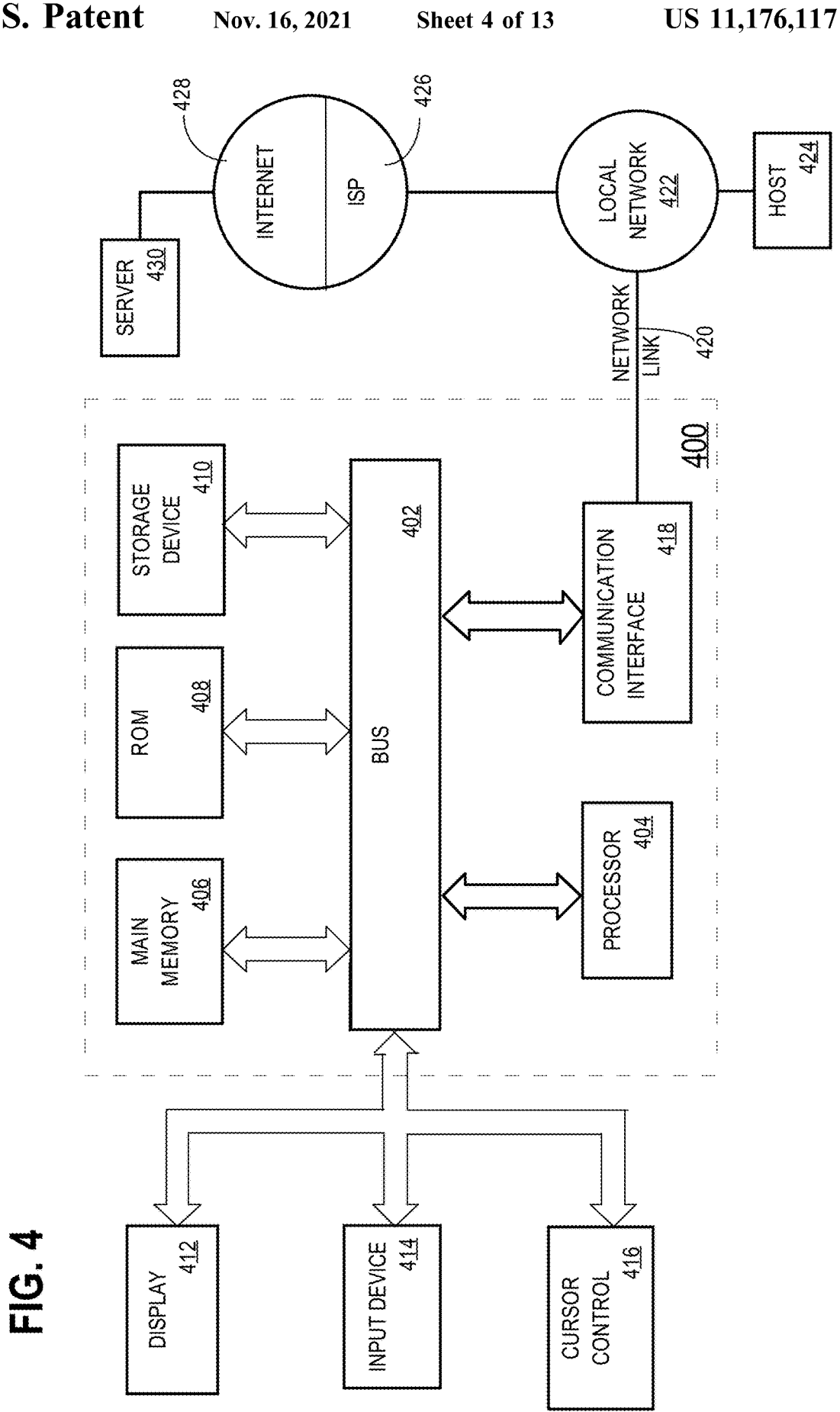
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage;

one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
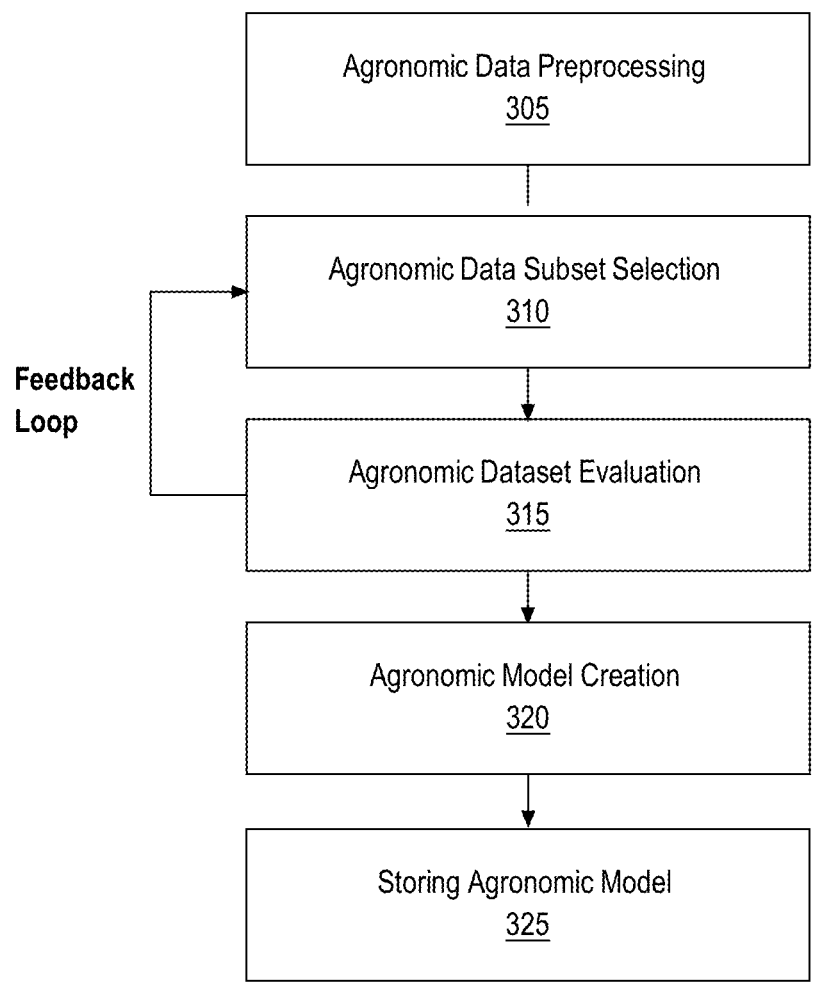
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. GPS Error Detection Subsystem

In an embodiment, the agricultural intelligence computer system 130, among other components, includes the GPS error detection subsystem 170. The GPS error detection subsystem 170 is programmed or configured to determine GPS errors between observed GPS planting data and observed GPS harvesting data. In an embodiment, the GPS error detection subsystem 170 may process agricultural data records to generate datasets of planting data and harvesting data that have been aggregated based upon geo-location and timestamps. In an embodiment, the agricultural data records may include observed geo-location information from planters planting hybrid seeds and from harvesters harvesting crop from agricultural fields. The agricultural data records may include planting data values and harvesting data values. The planting data values may include geo-location coordinates, such as GPS latitude-longitude values, timestamps representing the dates and times of observed planting data values, machine configuration data, such as a planter model identifier and a width of the planter, and treatment information including hybrid seed type. The harvesting data values may include geo-location coordinates, timestamps representing the dates and times of observed harvesting data values, and machine configuration data.

In an embodiment, the planting and harvesting datasets may be analyzed to determine corresponding matching planting and harvesting data points. The matching planting and harvesting data points are used to correlate planting geo-locations to harvesting geo-locations. The GPS error detection subsystem 170 may determine whether a GPS error exists between the planting geo-locations and their corresponding harvesting geo-locations. If a GPS error exists, then the GPS error detection subsystem 170 may calculate the size of the GPS error for each observed geo-location within a field.

In an embodiment, the GPS error detection subsystem 170 may comprise or be programmed with agricultural data record processing instructions 172, data point correlation instructions 174, and geo-location error calculation instructions 176. The agricultural data record processing instructions 172 provide instructions to process agricultural data records containing planting data values and harvesting data values to generate planting datasets and harvesting datasets. The planting datasets may represent a set of planting data values that have been aggregated based upon their proximity to each other and/or their timestamp values. The harvesting datasets may represent a set of harvesting data values that have been aggregated based upon their proximity to each other and their timestamp values. The data point correlation instructions 174 provide instructions to identify potential planting dataset and harvesting dataset pairs based on geo-location proximities of each of the planting and harvesting datasets. The geo-location error calculation instructions 176 provide instructions to determine an amount of GPS error based upon differences between geo-locations of data values of planting datasets and corresponding harvesting datasets from the planting-to-harvesting dataset pairs.

2.6. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Functional Overview—GPS Error Detection

Figure 7:
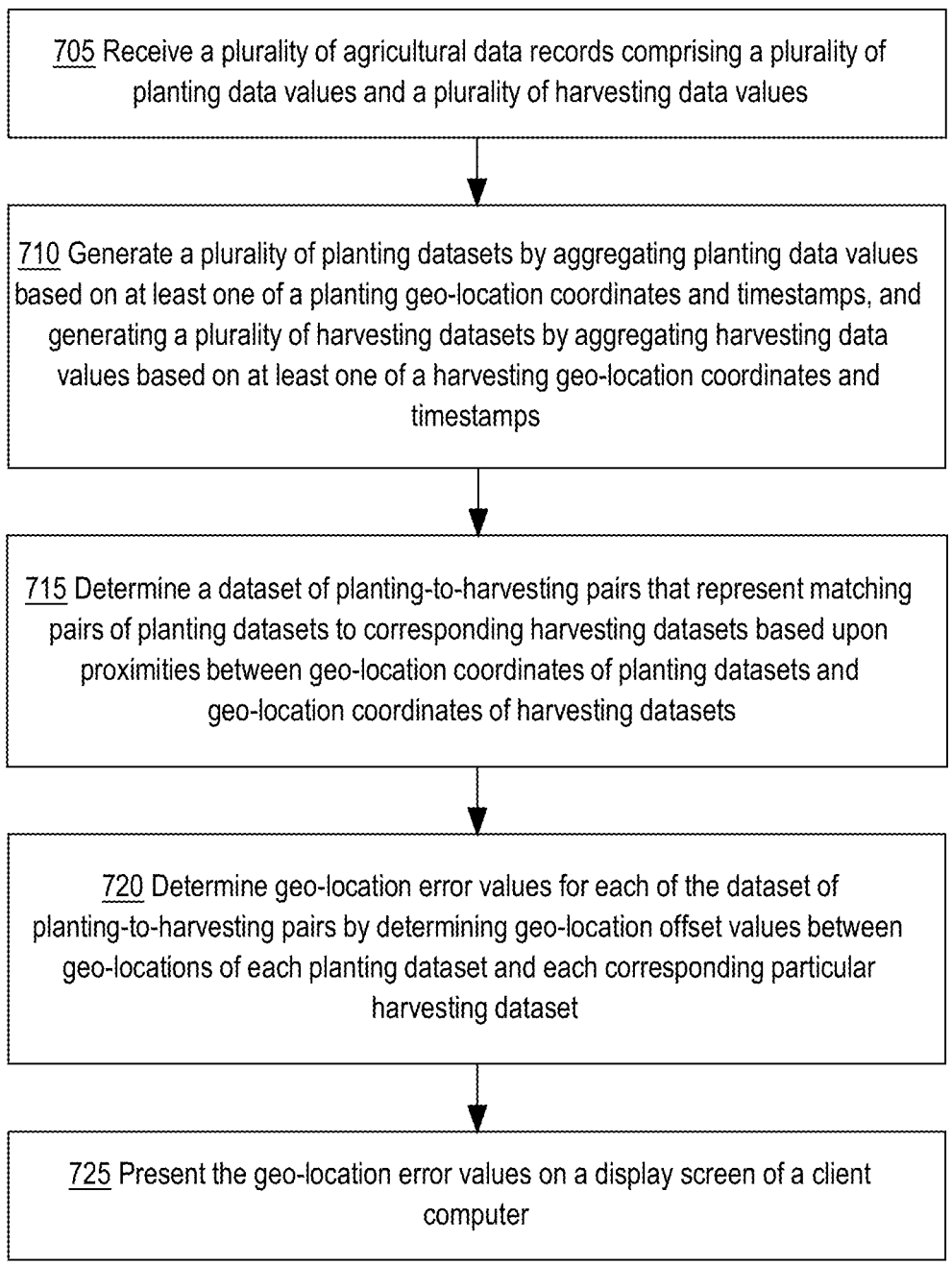
FIG. 7 depicts an example embodiment of determining GPS errors between observed data points of planting data and harvesting data.

In an embodiment, a computer-implemented process to detect GPS errors is founded on the expectation that the full width of a combine or harvester is expected to fall within the space covered by a single treatment that occurred previously in the season. This assumption is valid because in planting and treatment measurements, individual rows of a field do not have separate measurements. Therefore, if a combine's header falls outside the coverage of a treatment, then either an operator error or GPS error is detected. In either case, data calculated for the performance of a treatment most likely is inaccurate. FIG. 7 illustrates an example embodiment of determining GPS errors between observed data points of planting data and harvesting data. FIG. 7 may be programmed in program instructions as part of the instruction sets that have been previously described in section 2.5.

3.1. GPS Error Detection—Correlating Equipment Passes

Figure 8:
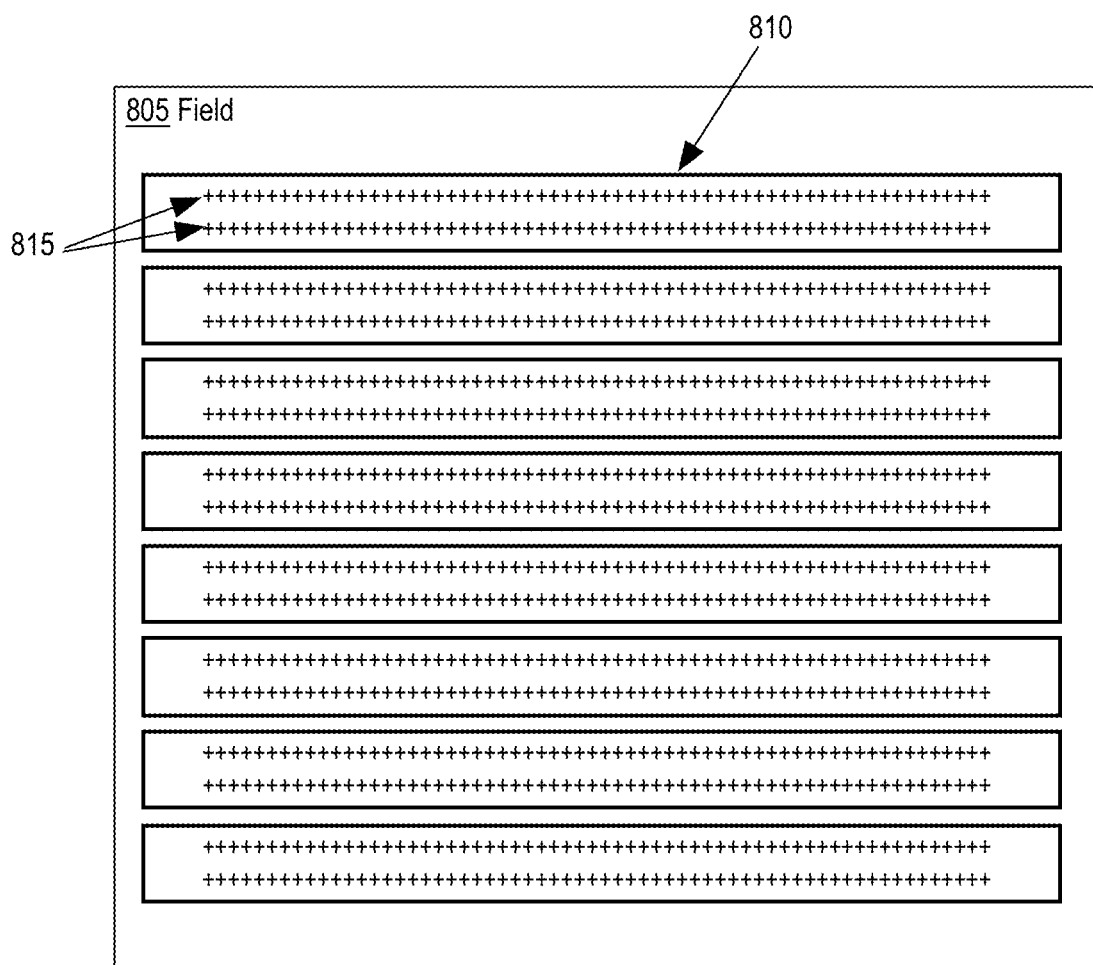
FIG. 8 illustrates an example field with multiple passes made by a planter during planting of a hybrid seed.

In an embodiment, one method for determining GPS errors between data points of planting data and harvesting data may include an approach of identifying sets of agricultural data records based upon passes of agricultural equipment during treatment of a field. For example, agricultural equipment, such as a planter or harvester, may treat a field by performing several horizontal or vertical passes across a field until the entire area of the field has been treated. Each pass may start on one side of the field and may span across an entire length of the field until the end of the field is reached. FIG. 8 illustrates an example field with multiple passes made by a planter during planting of a hybrid seed. Field 805 represents a field in which a planter has made several planting passes across the field to plant a hybrid seed. Pass 810 represent a single pass of the planter starting from the left end and moving across the field to the right end. Agricultural equipment, when treating a field may make several incremental passes across the field in order to systematically cover the entire field. Planting data values 815 represent captured geo-location information where hybrid seed was deposited during planting. Each "+" symbol may represent a geo-location where hybrid seed was deposited into the field.

3.1.1. Receiving Agricultural Data Records

At block 705, computer system 130 is programmed to receive agricultural data records for one or more fields. In an embodiment, the agricultural data records received by system 130 may include multiple layers of observed treatment data. Layers of treatment data may refer to different types of treatment events on fields. Examples of treatment may include, but are not limited to, planting hybrid seeds, harvesting crops, applying specific crop treatment, and any other type of field treatment applied to specific geo-locations within the field. Examples of different treatment layers may include a planting layer that represents planting data values observed during planting of hybrid seeds and a harvesting layer that represents harvesting data values observed during harvesting of crops. Planting data values may include data corresponding to geo-location coordinates, such as GPS latitude-longitude values, Universal Transverse Mercator (UTM) coordinates, or any other commercially available geographic coordinate units, timestamps representing the dates and times of observed planting data values, machine configuration data, such as a planter model identifier and a width of the planter, and treatment information including treatment type and hybrid seed type. Harvesting data values may include data corresponding to geo-location coordinates, timestamps of when crop is harvested at the specific geo-location, and machine configuration data.

In an embodiment, the agricultural data records may be received from field data 106 collected from agricultural machines such as planters and harvesters. For example, a planter may be used to plant hybrid seeds on multiple parallel rows of a field at the same time. The planter may collect planting data values from seed sensors configured to detect the time and location of when a seed is planted in a field. Planters may be equipped with multiple seed sensors. For instance, planters may be equipped with a transversely extending toolbar with multiple row units mounted. A row unit is an apparatus configured to plant seeds in a row of the field. Each row unit may deposit a seed into the ground at a configured interval and an attached seed sensor may detect the time when the seed is deposited. The seed sensors may also be equipped with a GPS sensor for detecting GPS coordinates of each seed deposited, or any other geo-location sensor.

In another example, a harvester may be equipped with multiple GPS-enabled harvest sensors configured to capture GPS coordinates of the areas of the field where the harvester collects mature crops from the field. In yet other examples, various agricultural machines may be equipped with GPS-enabled sensors for detecting GPS coordinates related to treatment of crops within the field.

In another embodiment, the agricultural data records may be received from external data 110 which may store geo-location information for fields previously planted and harvested by one or more agricultural machines. For instance, a planter and/or harvester, equipped with GPS-enabled sensors, may be enabled to collect and transmit the agricultural data records of the planting and harvesting events to the data server computer 108. The data server computer 108 may send external data 110, which may include the agricultural data records, to system 130.

3.1.2. Processing Agricultural Data Records

At block 710, the agricultural data record processing instructions 172 generates a plurality of planting datasets and a plurality of harvesting datasets based on at least one of geo-location information or timestamps of each of the planting data values and each of the harvesting data values. In an embodiment, the agricultural data record processing instructions 172 may aggregate planting data values based upon associated timestamp information to generate multiple planting datasets and may aggregate harvesting data values based upon associated timestamp information to generate multiple harvesting datasets. For example, if a planting data value has a timestamp that is within one second of the previous planting data value, then the agricultural data record processing instructions 172 may determine the planting data value and the previous planting data value belong to the same planting pass based upon the temporal proximity of the timestamps. If however, the subsequent planting data value has a timestamp that is 5 seconds after the previous timestamp, then the agricultural data record processing instructions 172 may determine that the subsequent planting data value belongs to another pass. The 5 second gap between timestamps may be indicative of the planter turning on the field to perform another pass across the field.

FIG. 9 illustrates an example embodiment of processing agricultural data records and determining planting datasets and harvesting datasets using agricultural equipment passes. Blocks 905-930 represent sub operations performed within block 710. At block 905, the agricultural data record processing instructions 172 aggregates planting data values into sets based on associated timestamps to generate planting datasets. Each planting dataset may represent planting data values belonging to a single planting pass by a planter or other agricultural equipment. Each set of planting data values represented by a planting dataset may be based on subsequent timestamps that are within a temporal threshold value. For example, if the planter deposits hybrid seeds during a single pass at a rate of 1 unit of hybrid seeds per second, then a threshold value greater than 1, such as 2 seconds, may be used to identify when the planter has stopped planting seeds during a pass. A large gap between subsequent timestamps may be indicative of the planter turning around to start a new pass. When the planter begins to turn, planting is stopped in order to ensure even planting during passes. Therefore the agricultural data record processing instructions 172 may identify the end of a pass if the temporal gap between timestamps is greater than the temporal threshold value. In an embodiment, the temporal threshold value may be configured based upon the type of agricultural equipment and the frequency at which hybrid seeds are planted into the field.

At block 910, the agricultural data record processing instructions 172 normalizes planting data values within the planting datasets to remove detectable GPS errors and to ensure that each of the planting data values within each planting dataset have the same heading direction. During treatment of a field, agricultural equipment performs a series of passes across the field. During each pass the agricultural equipment heads in one direction along the field. As a result, planting data values associated with the pass should have the same heading direction. In an embodiment, each of the planting data values may include latitude and longitude values that describe a geo-location. A heading direction may be determined by analyzing consecutive planting data values and determining differences between the latitude and longitude of the consecutive planting data values. For example, if a first planting data value has a latitude-longitude value of (100, 65) and a second planting data value has a latitude-longitude value of (100, 85), then the agricultural data record processing instructions 172 may determine that the heading associated with the first planting data value is along the longitudinal axis in a positive direction based upon the change in longitude from 65 to 85. The heading direction of the second planting data value may be determined based on the latitude-longitude value of the second planting data value and a third planting data value.

If however, differences between both the latitude and longitude values exist between consecutive planting data values, then the agricultural data record processing instructions 172 may determine, based on the differences, whether changes in either the latitude or longitude between consecutive planting data values is a result of a GPS error or a result of how the planting pass is oriented. For example, if the difference in latitude for consecutive planting data values is from 100 to 102 and the difference in longitude is from 65 to 85, then the agricultural data record processing instructions 172 may determine that the slight latitude change of 100 to 102 is not the dominant direction of the agricultural equipment and that the latitude change may be a result of a GPS error or a result of how the planting pass is oriented with respect to latitude and longitude values. In an embodiment, if the agricultural data record processing instructions 172 determines that the detected changes in the latitude and/or longitude between consecutive planting data values are a result of GPS detection errors, then the agricultural data record processing instructions 172 may adjust the latitude and/or longitude to correct the errors.

In an embodiment, if the agricultural data record processing instructions 172 determines that the detected changes in the latitude and longitude between consecutive planting data values are a result of the orientation of the planting pass, then the agricultural data record processing instructions 172 may adjust the latitude and longitude of planting data values to reflect changes in geo-location on a single axis. For example, if both the latitude and longitude changed between consecutive planting data values, then the agricultural data record processing instructions 172 may adjust both the latitude and longitude such that only one of the latitude and longitude values changes between consecutive planting data records. Adjustments to the geo-locations may be made such that the relative distance between consecutive planting data records is maintained. The resulting planting data values for a planting dataset, which represents a planting pass, may show changes in GPS coordinate values along a single axis, such as either latitude or longitude. By transforming the planting data values to reflect GPS coordinate value changes along a single axis, further computation may be simplified by only relying on changes on a single axis over two axes.

In an embodiment, the agricultural data record processing instructions 172 may determine other GPS errors within planting data values based upon variations between planting data values observed from parallel row units on a planter. As described, planters may be equipped with multiple row unit configured to plant, in parallel, multiple hybrids seeds at once. The distances between parallel planted hybrid seeds may be calculated based upon the distances between row units on the planter. The agricultural data record processing instructions 172 may determine widths between adjacent row units based upon the type of planter and the row unit spacing on the planter. The known widths between adjacent row units may be used by the agricultural data record processing instructions 172 to determine whether shifting errors between detected planting data values exist by comparing the relative distance between geo-locations of planting data values of consecutive row units over multiple seed planting events. For example, if the distance between row unit 1 and row unit 2 on the planter is 1 foot and observed GPS coordinates between row unit 1 and row unit 2 indicate a 1 foot gap during a first planting event and a 1.2 foot gap during a second planting event, then the agricultural data record processing instructions 172 may determine a possible GPS error for the second planting event as the actual gap between row units is only 1 foot. In an embodiment, the agricultural data record processing instructions 172 may detect potential GPS errors between observed GPS coordinates of adjacent row units and may adjust one or more GPS coordinates of planting data values in order to correct slight shifts caused by the GPS errors.

In an embodiment, the agricultural data record processing instructions 172 may also associate distance values to each of the planting data values using known widths of the planter and its attached row units. For example, the agricultural data record processing instructions 172 may determine lengths between planting data values based upon the configured widths between row units. The determine lengths may also be applied to planting data values from consecutive planting events. For example, if a specific change in latitude and/or longitude is determined to translate to a distance of 1 foot, then the similar changes in latitude/longitude may be used to calculate other distances between other planting data values.

In an embodiment, the agricultural data record processing instructions 172 may normalize planting data values by shifting GPS coordinates, rotating the latitude and longitude of the GPS coordinates, and applying measurable units to GPS coordinates to reduce observed GPS errors based upon adjacent planting data values and associating heading directions to each planting data value.

Normalized planting data values may be used to further refine sets of planting data values that make up the planting datasets generated at block 905. In an embodiment, the agricultural data record processing instructions 172 may optionally proceed back to block 905 to validate the generated planting datasets using heading directions associated with planting data values. For example, the planting datasets initially generated at block 905 were based upon timestamp values where a new planting dataset was generated if the gap between consecutive planting data values was above a temporal threshold value, which indicated that the planter may be turning and therefore starting a new planting pass. However, large gaps between timestamp values may also be attributed to other conditions such as, sensor errors or stopping and starting the planter within the field.

At block 905, the agricultural data record processing instructions 172 may analyze heading directions associated with planting data values of consecutive planting datasets to determine whether the heading direction changes for each consecutive planting dataset. Consecutive planting datasets should have associated heading directions that switch in orientation indicating that the planter turned around and started a new pass. If consecutive planting datasets have the same heading direction, then the consecutive planting datasets may belong to the same planting pass and the gap between subsequent timestamps of planting data values may have been the result of GPS detection errors or the planter stopping midway through a planting pass. In an embodiment, agricultural data record processing instructions 172 may merge consecutive planting datasets if the planting dataset have the same heading direction.

At block 915, the agricultural data record processing instructions 172 may assign a unique planting pass identifier (ID) to each of the planting datasets. Each planting dataset may represent planting data values from a particular planting pass of the planter. In an embodiment, the agricultural data record processing instructions 172 may assign unique planting pass IDs to each of the planting datasets.

At block 920, the agricultural data record processing instructions 172 aggregates harvesting data values into sets based on timestamps to generate harvesting datasets. In an embodiment, the agricultural data record processing instructions 172 may analyze timestamps of consecutive harvesting data values to identify an end of a harvesting pass based upon whether the temporal gap between timestamps is greater than the temporal threshold value. The temporal threshold value may be configured based upon the type of agricultural equipment and the frequency at which crops are harvested from the field. Each harvesting dataset may represent consecutive harvesting data values belonging to a single harvesting pass by a harvester if the corresponding harvesting data values have consecutive timestamps that are below the temporal threshold value.

At block 925, the agricultural data record processing instructions 172 normalizes harvesting data values within the harvesting datasets to remove detectable GPS errors and to ensure that each of the harvesting data values within each harvesting dataset have the same heading direction. In an embodiment, the agricultural data record processing instructions 172 may apply the same transformations performed on the planting data values of the planting datasets to the harvesting data values within the harvesting datasets. For example, if the GPS coordinates of planting data values were rotated to ensure that the planting passes are along a single axis, then the agricultural data record processing instructions 172 may apply the same rotation to the harvesting data values in order to ensure consistency between the planting datasets and the harvesting datasets. In an embodiment, the agricultural data record processing instructions 172 may adjust scaling to be applied to the harvesting datasets based upon the width of the harvester and the relative spacing between harvest units on the harvester.

In an embodiment, the agricultural data record processing instructions 172 may optionally proceed back to block 905 to validate the generated harvesting datasets using heading directions associated with harvesting data values. At block 905, the agricultural data record processing instructions 172 may analyze heading directions associated with harvesting data values of consecutive harvesting datasets to determine whether the heading direction changes for each consecutive harvesting dataset. The agricultural data record processing instructions 172 may merge consecutive harvesting datasets if the harvesting datasets have the same heading direction.

At block 930, the agricultural data record processing instructions 172 may assign a unique harvesting pass identifier (ID) to each of the harvesting datasets. Each harvesting dataset may represent harvesting data values from a particular harvesting pass of the harvester. In an embodiment, the agricultural data record processing instructions 172 may assign unique harvesting pass IDs to each of the harvesting datasets.

3.1.3. Determine Matching Planting Pass and Harvesting Pass Pairs

Referring to FIG. 7, at block 715 the data point correlation instructions 174 determines a dataset of planting-to-harvesting pairs that represent matching pairs of planting and harvesting datasets based upon proximities of geo-locations associated with each of the planting and harvesting datasets. In an embodiment, the data point correlation instructions 174 may, for each harvesting dataset, determine the closest planting dataset based upon associated geo-location coordinates of harvesting data values from the harvesting dataset and associated geo-location coordinates of planting data values from the planting datasets. For example, the data point correlation instructions 174 may select one harvest data value, multiple harvest data values, or every harvest data value from the harvest dataset and compare the associated geo-locations to geo-locations of planting data values of the planting datasets to determine which planting dataset is closest to the harvesting dataset. Upon determining matches between the harvesting datasets and the planting datasets, the data point correlation instructions 174 may assign the planting pass IDs of the planting datasets to the corresponding harvesting datasets. In an embodiment, a planting pass ID may be assigned to multiple harvesting datasets. This may occur if the width of the harvester is shorter than the width of the planter, such that multiple harvest passes were needed to harvest the area of a single planting pass.

3.1.4. Calculating GPS Error Values

At block 720, the geo-location error calculation instructions 176 determines geo-location error values for each of the planting-to-harvesting pairs of the dataset of planting-to-harvesting pairs. The geo-location error calculation instructions 176 may calculate geo-location offset values between geo-locations of planting data values, of a planting dataset, and geo-locations of harvesting data values, of a corresponding harvesting dataset, by calculating the perpendicular distance between the two geo-locations. In an embodiment, the geo-location error calculation instructions 176 may determine centroid locations of the harvester for particular harvesting data values of a particular harvesting dataset by determining a centroid from a plurality of harvesting data values of the particular harvesting dataset that have the same timestamps.

Figure 10:
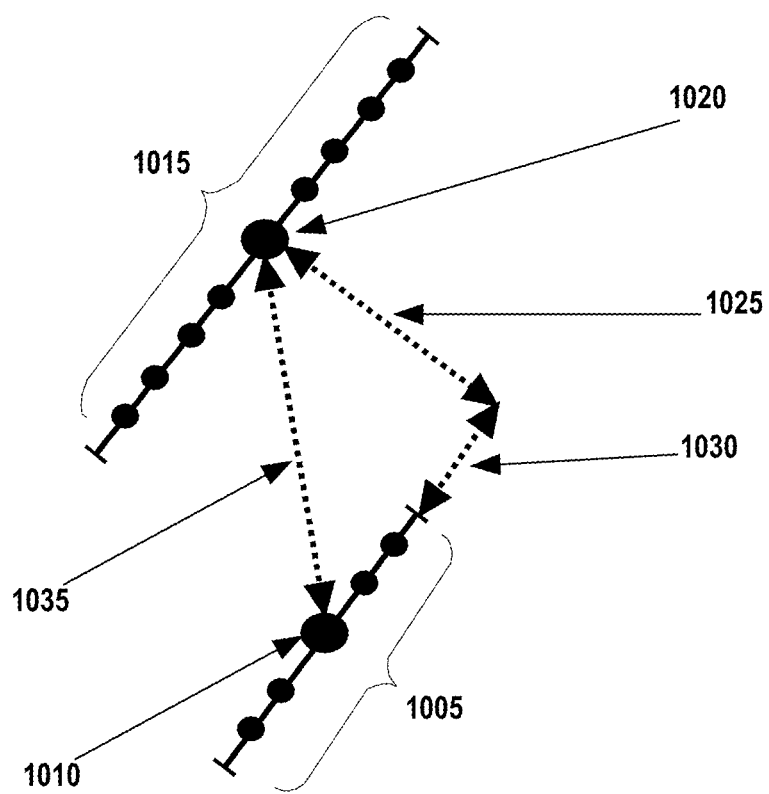
FIG. 10 illustrates an example embodiment of determining perpendicular distance values between centroid points of harvesting data values and planting data values.

FIG. 10 illustrates an example embodiment of determining perpendicular distance values between centroid points of harvesting data values and planting data values. Harvest line 1005 may represent the width of the harvester, including harvesting data values observed from sensors on the harvester. Harvest centroid 1010 may represent the centroid position of the harvester and may be calculated based upon the harvesting data values and the width of the harvest line 1005. Planting line 1015 may represent the width of the planter, including planting data values observed from sensors on the planter. Planting centroid 1020 may represent the centroid position calculated based on the width of the planter and the corresponding planting data values. The perpendicular distance may be calculated as by projecting two unit vectors. Unit vector 1025 represents the distance from planting centroid 1020 to the harvest line in along the heading direction of the harvester. Unit vector 1030 represents the distance from harvest centroid 1010 to unit vector 1025 in a direction that is perpendicular to the heading direction of the harvester. The sum of unit vector 1025 and unit vector 1030 would equal the distance between planting centroid 1020 and harvest centroid 1010.

In an embodiment, the geo-location error calculation instructions 176 may calculate the length of coverage of the harvesting dataset with respect to the planting dataset as:

$$\text{Harvest coverage} = 1 - \left[\text{ABS(perpendicular dist.)} + \frac{h_{width}}{2} - \frac{p_{width}}{2}\right]$$

where $h_{width}$ is the width of the harvester and $p_{width}$ is the width of the planter.

The harvest coverage may represent the amount of the harvester that covers an area of the planter. The geo-location error calculation instructions 176 may calculate harvest coverages for each harvesting dataset and for each harvest data value within each harvesting dataset. In other embodiments, the geo-location error calculation instructions 176 may selectively choose a subset of harvesting datasets to determine harvest coverage. For example, every 10$^{th}$ harvesting data value from a harvesting dataset may be used to determine harvest coverage using the corresponding planting data value.

In another embodiment, the geo-location error calculation instructions 176 may calculate harvest coverage as a percentage of the harvester that overlaps with planter passes. The percentage of coverage may be calculated as:

$$\text{Harvest coverage} = 1 - \text{CLIP}\left[\left(\text{ABS(perpendicular dist.)} + \frac{h_{width}}{2} - \frac{p_{width}}{2}\right)/h_{width}, 0, 1\right]$$

where $h_{width}$ is the width of the harvester and $p_{width}$ is the width of the planter. The CLIP function serves to ensure that the harvest coverage value is represented as a value between 0 and 1.

3.1.5. Presenting GPS Error Values

At block 725, system 130 may present geo-location error values to a client device display screen. In an embodiment, system 130 may output the geo-location error values in various forms to a user associated with the client device, such as the field manager computer device 104. For example, the geo-location error values, measured by harvest coverage of the planter passes may be outputted as data quality metrics in a data file for the field. The data quality metric may comprise a text label, metadata value, or numeric value that signals a data quality issue in the data file. In another embodiment, system 130 may transmit a real-time notification, in response to detecting GPS errors, to a user account that is associated with a data file. The user account could be for a grower 102, a data custodian or a data analyst.

FIG. 12 illustrates embodiments of graphical interfaces presented on a client computer that graphically display the geo-location error values within a field. Graph 1205 displays the percentage of harvest coverage that is less than 60% of a planter pass on the field. Dots 1210 represent overlaps of planting datasets and harvesting datasets that have coverage greater than or equal to 60%. Marks 1215 represent overlaps of planting datasets and harvesting datasets that have coverage less than 60%. Graph 1205 may be used by a grower 102 to efficiently recognize areas within the field where GPS errors between the planter and the harvester may be causing inaccurate harvesting of the hybrid crop.

Graph 1220 displays the percentage of harvest coverage that is less than 90% of a planter pass on the field. Dots 1225 represent overlaps of planting datasets and harvesting datasets that have coverage greater than or equal to 90%. Marks 1230 represent overlaps of planting datasets and harvesting datasets that have coverage less than 90%. Graphs 1205 and 1220 are sample representations of how GPS error values between planting and harvesting events may be presented to a grower 102. Grower 102 may configure system 130 to present various graphs with different coverage thresholds to the grower 102, including graphs that present the thresholds in terms of units, such as inches or feet. For example, the presented graph may display harvest coverage where the amount of harvester overlap is greater than or equal to 2 feet.

3.2. GPS Error Detection—Iterative Approach

In an embodiment, one method for determining GPS errors between observed data points of planting data and harvesting data may include an approach of iterating through harvesting data values and determining a nearest corresponding planting data values based upon geo-location proximity. Once matching pairs of planting data values and harvesting data values are determined, geo-location distances between matching pairs may be calculated to determine whether GPS error exist between the planting data values and the corresponding harvesting data values.

3.2.1. Receiving Agricultural Data Records

Referring to FIG. 7, at block 705, computer system 130 is programmed to receive agricultural data records for one or more fields. The agricultural data records received by system 130 may include multiple layers of observed treatment data, such as a planting layer represented by planting data values and a harvesting layer represented by harvesting data values. Each of the planting and harvesting data values may include geo-location information, such as GPS coordinates, and timestamp information. GPS coordinates may represent a small area of the field where the planting event or harvesting event occurs. In an embodiment, the agricultural data records may be received from field data 106 collected from agricultural machines or from external data 110 sent from data server computer 108.

3.2.2. Processing Agricultural Data Records

At block 710, the agricultural data record processing instructions 172 generates a plurality of planting datasets and a plurality of harvesting datasets based upon geo-location information and timestamps of each of the planting data values and each of the harvesting data values. In an embodiment, the agricultural data record processing instructions 172 may aggregate planting data values that have the same associated timestamp information and geo-location information indicating that the planting data values are close in proximity. The generated planting datasets may each represent a hybrid seed planting event by the planter at a specific time. A hybrid seed planting event represents a moment when each of the multiple row units of the planter deposit hybrid seeds into the ground. For example, if the planter has 5 row units that each deposit one hybrid seed at a rate of one seed per second, then at each time interval the planter sensors may generate 5 planting data values, one for each hybrid seed planted by the 5 row units. Referring to FIG. 10, planting line 1015 represents the width of the planter and each of the dots along the planting line 1015 each represent planting data values from a planting event.

Figure 11A:
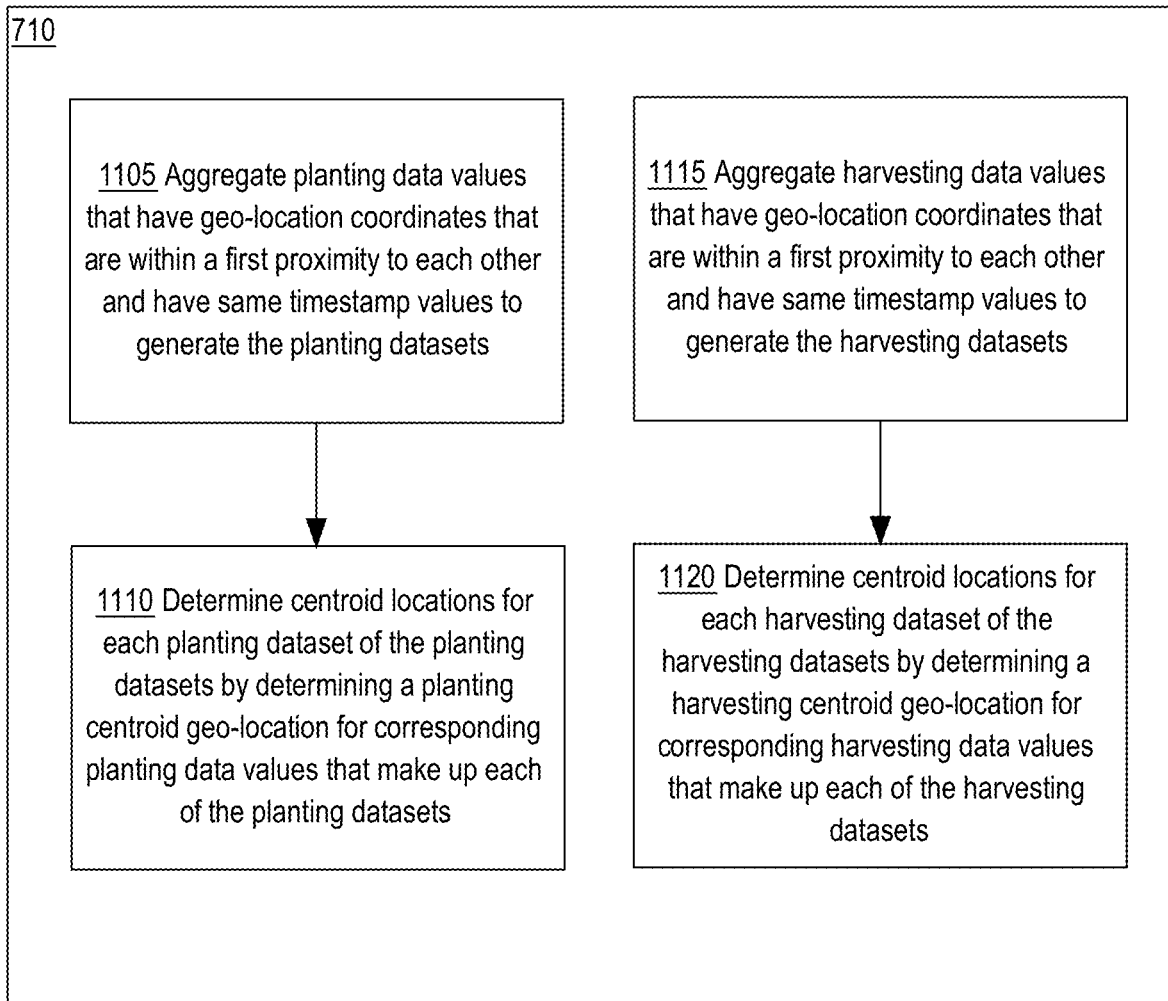
FIG. 11A illustrates an example embodiment of processing agricultural data records and determining planting datasets and harvesting datasets based upon widths of agricultural equipment.

FIG. 11A illustrates an example embodiment of processing agricultural data records and determining planting datasets and harvesting datasets based upon widths of agricultural equipment. Blocks 1105-1120 represent sub operations performed within block 710. At block 1105, agricultural data record processing instructions 172 aggregates planting data values that have geo-locations indicating that the planting data values are from the same planting event and have similar associated timestamps. For example, planting data values for observations of hybrid seeds planted at the same time by row units on the same planter are aggregated to generate a planting dataset. The result of the aggregation of planting data values is a plurality of planting datasets for each planting event performed on the field by the planter. Each planting dataset may represent an area made up of the union of geo-locations of the planting data values.

At block 1110, agricultural data record processing instructions 172 determines a centroid location for each planting dataset. In an embodiment, the agricultural data record processing instructions 172 determines the width of the planter based upon the planter type and model. In another embodiment, the agricultural data record processing instructions 172 determines the width of the planter based upon planting data values of the planting dataset that are the furthest from the centroid location and are perpendicular to the heading direction. The agricultural data record processing instructions 172 determines the centroid location based upon each of the planting data values and the overall width of the planter. Referring to FIG. 10, planting centroid 1020 represents the centroid location of the planting line 1015 of the planter.

At block 1115, agricultural data record processing instructions 172 aggregates harvesting data values that have geo-locations indicated that the harvesting data values are from the same harvesting event and have similar associated timestamps. For example, harvesting data values for observations of crops harvested at the same time by the same harvester are aggregated to generate a harvesting dataset. The result of aggregating harvesting data values is a plurality of harvesting datasets for each harvesting event performed on the field by a harvester.

At block 1120, agricultural data record processing instructions 172 determines a centroid location for each harvesting dataset. In an embodiment, the agricultural data record processing instructions 172 determines the width of the harvester based upon the harvester type and model. The agricultural data record processing instructions 172 determines the centroid location based upon each of the harvesting data values in the harvesting dataset. In another embodiment, the agricultural data record processing instructions 172 determines the width of the harvester based upon harvesting data values of the harvesting dataset that are the furthest from the centroid location and are perpendicular to the heading direction.

In an embodiment, aggregating planting data values and determining the centroid location for planting datasets (blocks 1105 and 1110) and aggregating harvesting data values and determining the centroid location for harvesting datasets (blocks 1115 and 1120) may be performed in parallel or sequentially in either order. For example, the agricultural data record processing instructions 172 may perform blocks 1115 and 1120 then perform blocks 1105 and 1110 or may perform blocks 1105 and 1110 in parallel with blocks 1115 and 1120.

3.2.3. Determine Matches Planting Datasets

Figure 11B:
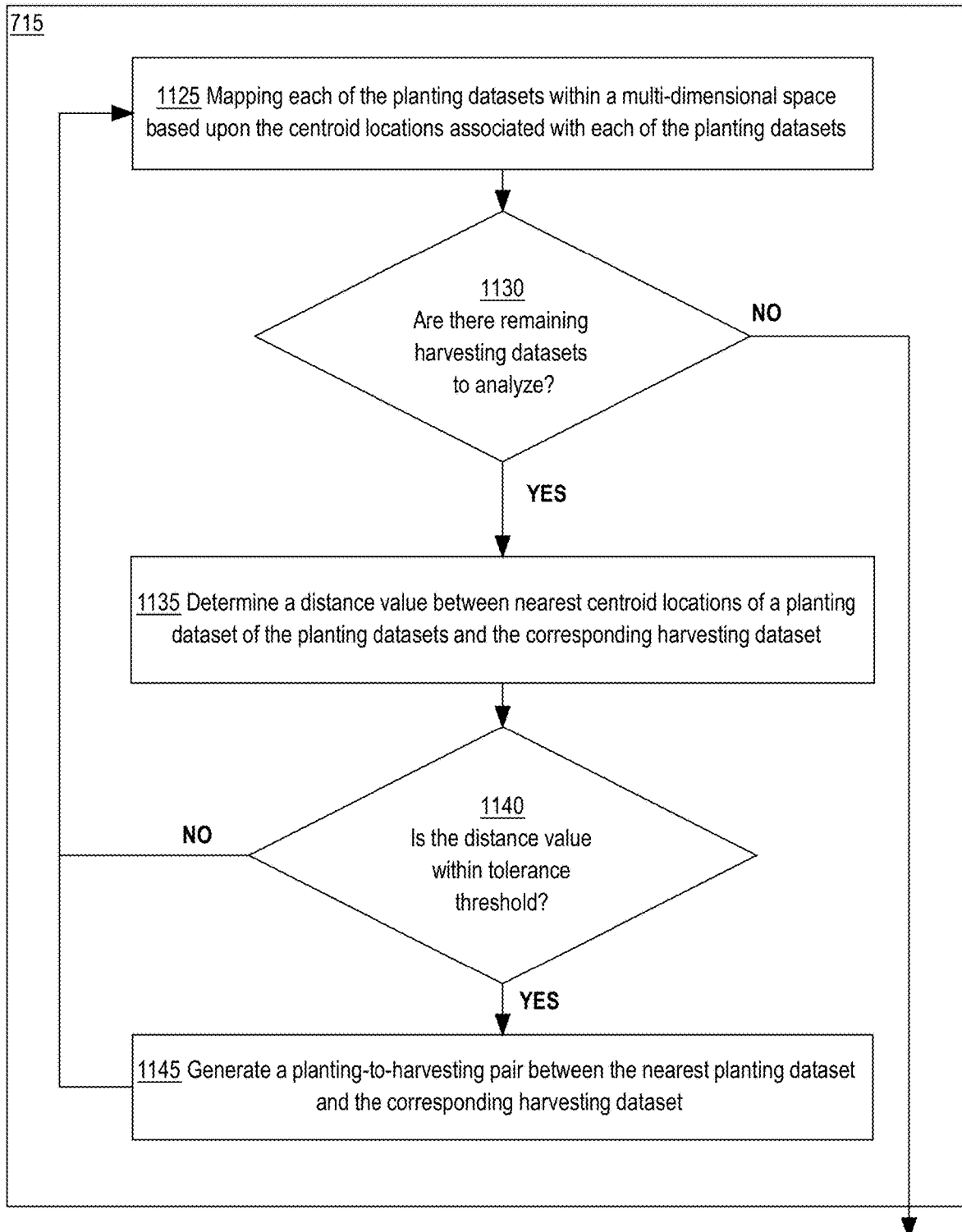
FIG. 11B illustrates an example embodiment of determining matching pairs of planting datasets and harvesting datasets.

Referring to FIG. 7, at block 715 the data point correlation instructions 174 determines a dataset of planting-to-harvesting pairs that represent matching pairs of planting and harvesting datasets based upon proximities of geo-locations associated with each of the planting and harvesting datasets. FIG. 11B illustrates an example embodiment of determining matching pairs of planting datasets and harvesting datasets. Sub-operations of block 715 are illustrated by blocks 1125-1145 of FIG. 11B.

At block 1125, the data point correlation instructions 174 maps the planting datasets within a multi-dimensional space using geo-locations of the centroids associated with each planting dataset. In an embodiment, the data point correlation instructions 174 may spatially index each centroid of the planting datasets within a multi-dimensional space. For example, the data point correlation instructions 174 may implement a k-dimensional tree and organize geo-locations of centroids by mapping each of the centroids within the k-dimensional tree. The k-dimensional tree may then be used to determine which centroid of the planting datasets is closest in proximity to a centroid location of a harvesting dataset.

In an embodiment, the data point correlation instructions 174 may iterate through each of the harvesting datasets to determine which planting dataset is closest in proximity to a particular harvesting dataset. At decision diamond 1130, the data point correlation instructions 174 may determine whether there are remaining harvesting datasets to map to corresponding planting datasets. If there are remaining harvesting datasets to map, then the data point correlation instructions 174 may select a harvesting dataset from the remaining set of harvesting datasets and proceed to block 1135. If however, there are no more remaining harvesting datasets to map to a corresponding planting dataset, then the data point correlation instructions 174 may proceed to block 720 of FIG. 7, to determine geo-location offsets between planting datasets and harvesting datasets.

At block 1135, the data point correlation instructions 174 determines the planting dataset that is nearest to the selected harvesting dataset. In an embodiment, the data point correlation instructions 174 may use the generated k-dimensional tree to determine which centroid location of a planting dataset is nearest to the centroid location of the selected harvesting dataset. The data point correlation instructions 174 may calculate a distance value between the centroid location of a planting dataset and the centroid location of the selected harvesting dataset using the geo-location coordinates of each centroid location.

At decision diamond 1140, the data point correlation instructions 174 determines whether the distance value between the centroid locations of the planting dataset and the selected harvesting dataset are within a tolerance threshold. In an embodiment, the tolerance threshold may represent a maximum distance between centroid locations to be considered a matching pair. For example, if the distance value is greater than a sum of the width of the planter and the width of the harvester, then the data point correlation instructions 174 may determine that the planting pass of the planter and the harvest pass of the harvester to do not overlap at all. In this case, the data point correlation instructions 174 may conclude that the planting dataset and the selected harvesting dataset should not be considered matching pairs. The data point correlation instructions 174 may then associate an "NA" value to the selected harvesting dataset as no corresponding planting dataset was found and may proceed back to decision diamond 1130 to evaluate another harvesting dataset. If however, the distance value is within the tolerance threshold, then the data point correlation instructions 174 may proceed to block 1145.

In another embodiment, the tolerance threshold may represent a maximum tolerance between heading directions for the planting dataset and the harvesting dataset. For example, if the heading directions between the planting dataset and the harvesting dataset differ to a great enough degree, then the data point correlation instructions 174 may conclude that the planting dataset and the selected harvesting dataset do not match. In an embodiment, the data point correlation instructions 174 may determine if the heading directions of the planting dataset and the harvesting dataset differ too greatly, as:

$$ABS(SIN(harvest_{heading} \bmod 180) - (planting_{heading} \bmod 180)) > 0.1$$

where $harvest_{heading}$ is the heading direction associated with the harvesting dataset and $planting_{heading}$ is the heading direction associated with the planting dataset. The "0.1" value represents the tolerance threshold value.

In an embodiment, if the difference in heading directions is above the tolerance threshold then the data point correlation instructions 174 may determine that the selected harvesting dataset and the planting dataset do not match. If there is no match, then the data point correlation instructions 174 may proceed back to decision diamond 1130 to determine whether there are remaining harvesting datasets to analyze. If the difference in heading directions is within the tolerance threshold then the data point correlation instructions 174 may proceed to block 1145.

At block 1145, the data point correlation instructions 174 generates a planting-to-harvesting pair for the matching planting dataset and the selected harvesting dataset. Generated planting-to-harvesting pairs may be stored within a dataset of planting-to-harvesting pairs for later use.

3.2.4. Calculating GPS Error Values

Referring back to FIG. 7, at block 720 the geo-location error calculation instructions 176 determines geo-location error values between each of the planting-to-harvesting pairs of the dataset of planting-to-harvesting pairs. The geo-location error calculation instructions 176 may calculate geo-location offset values between geo-locations of planting data values of a planting dataset and geo-locations of harvesting data values of a harvesting dataset by calculating the perpendicular distance between the two geo-locations.

In an embodiment, the geo-location error calculation instructions 176 may calculate harvest coverage as a percentage of the harvester that overlaps with planter passes. The percentage of coverage may be calculated as:

$$\text{Harvest coverage} = 1 - \text{CLIP}\left[\left(\text{ABS(perpendicular dist.)} + \frac{h_{width}}{2} - \frac{p_{width}}{2}\right)/h_{width}, 0, 1\right]$$

where $h_{width}$ is the width of the harvester and $p_{width}$ is the width of the planter. The CLIP function serves to ensure that the harvest coverage value is represented as a value between 0 and 1.

The geo-location error calculation instructions 176 may calculate harvest coverages for each harvesting dataset using the centroid locations of each harvesting dataset. In other embodiments, the geo-location error calculation instructions 176 may selectively choose a subset of harvesting datasets to determine harvest coverage. For example, every $10^{th}$ harvesting data value from a harvesting dataset may be used to determine harvest coverage using the corresponding planting data value.

In an embodiment, the geo-location error calculation instructions 176 may compute a proportion harvest coverage records that are less that a configured value x for x starting from "0" to "1" in increments of 0.01.

3.2.5 Presenting GPS Error Values

At block 725, system 130 may present geo-location error values to a client device display screen. In an embodiment, system 130 may output the geo-location error values in various forms to a user associated with the client device. For example, the geo-location error values, measured by harvest coverage of the planter passes may be outputted as data quality metrics in a data file for the field. The data quality metric may comprise a text label, metadata value, or numeric value that signals a data quality issue in the data file. In another embodiment, system 130 may transmit a real-time notification, in response to detecting GPS errors, to a user account that is associated with a data file. The user account could be for a grower 102, a data custodian or a data analyst.

An example of presenting a graphical display of harvest coverage is graph 1205. Graph 1205 displays the percentage of harvest coverage that is less than 60% of a planter pass on the field. Dots 1210 represent overlaps of planting datasets and harvesting datasets that have coverage greater than or equal to 60%. Marks 1215 represent overlaps of planting datasets and harvesting datasets that have coverage less than 60%. Graph 1205 may be used by a grower 102 to efficiently recognize areas within the field where GPS errors between the planter and the harvester may be causing inaccurate harvesting of the hybrid crop.

Graph 1220 displays the percentage of harvest coverage that is less than 90% of a planter pass on the field. Dots 1225 represent overlaps of planting datasets and harvesting datasets that have coverage greater than or equal to 90%. Marks 1230 represent overlaps of planting datasets and harvesting datasets that have coverage less than 90%. Graphs 1205 and 1220 are sample representations of how GPS error values between planting and harvesting events may be presented to a grower 102. Grower 102 may configure system 130 to present various graphs with different coverage thresholds to the grower 102, including graphs that present the thresholds in terms of units, such as inches or feet. For example, the presented graph may display harvest coverage where the amount of harvester overlap is greater than or equal to 2 feet.

It will be apparent from the disclosure as a whole that embodiments are directed to practical applications of computing technology, such as error correction of digitally stored location data of agricultural equipment treatment paths. For example, embodiments are directed to correlating multiple agricultural equipment treatment paths in order to ensure accurate planting, treatment, and harvesting of hybrid seeds and crops. Embodiments describe identifying errors in location data caused by either geo-location observation errors and/or equipment path errors caused by agricultural equipment traveling along an inaccurate treatment path. System 130 may identify and correlate multiple different treatment paths of agricultural equipment and correct for errors in location data. Corrected location data may then be used to correlated crop observations to prior treatments of crop. More accurate treatment observations (corrected observations) may lead to more efficient tracking of crop growth and crop yields for multiple hybrid seeds planted within fields.

In an embodiment, corrected location data may be used to program future treatments of crop on fields by agricultural equipment. For example, location data identified and corrected from planters and other treatment equipment may be used to program harvest paths of harvesters in order to ensure accurate harvesting of hybrid crop planted. In another embodiment, corrected location data may be used to reduce the number of planting, treatment, and harvest passes performed by agricultural equipment. For example, corrected location data may be used to map where hybrid seeds have been planted and, for example harvesters, may be programmed such that the number of harvest passes performed within the field may be reduced by maximizing their coverage for harvesting planted crop based on the corrected location data.

In another embodiment, corrected location data may be used in real-time to adjust treatment paths of agricultural equipment during treatment, in order to ensure accurate treatment of planted crop. For example, harvest paths of harvesters may be adjusted if a current path of the harvester is not tracking corrected location data from a planter or other agricultural equipment. The harvester may be programmed to automatically shift or rotate the harvester's current path in order to more accurately track a path that covers the planted crop.

In yet another embodiment, correlating location data from multiple different treatments may be parallelized using multiple different processors, such that each process correlates planting and harvesting passes in parallel; thus reducing processing time to correlate the multiple planting and harvesting passes.

4. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    receiving, over a digital data communication network at a server computer, agricultural data records comprising a plurality of planting data values and a plurality of harvesting data values, wherein the plurality of planting data values comprises planting geo-location coordinates and corresponding timestamps and the plurality of harvesting data values comprises harvesting geo-location coordinates and corresponding timestamps;
    generating, by the server computer, a plurality of planting datasets by aggregating planting data values, of the plurality of planting data values, based on at least one of planting geo-location coordinates and timestamps, and generating a plurality of harvesting datasets by aggregating harvesting data values, of the plurality of harvesting data values, based on at least one of harvesting geo-location coordinates and timestamps;
    determining, by the server computer, a dataset of planting-to-harvesting pairs that represent matching pairs of planting datasets to corresponding harvesting datasets based upon proximities between geo-location coordinates of planting datasets and geo-location coordinates of harvesting datasets;
    determining, by the server computer, geo-location error values for each of the dataset of planting-to-harvesting pairs by determining geo-location offset values between geo-locations of each planting dataset and each corresponding particular harvesting dataset;
    based on the determined geo-location error values, correcting shifts caused by the geo-location error values by adjusting one or more geo-location coordinates for each of the dataset of planting-to-harvesting pairs; and
    based on the adjusted one or more geo-location coordinates, performing one or more real-time adjustments of a direction of an agricultural equipment during treatment of one or more fields.

2. The computer-implemented method of claim 1, further comprising:
    determining an overall field quality value for a field of the one or more fields by computing a sum of the geo-location error values and dividing the sum by a field specific error threshold value; and
    presenting the overall field quality value on a display screen of a client computer.

3. The computer-implemented method of claim 1, further comprising:
    generating a graphical representation of a field with the geo-location error values, the graphical representation comprising:
    one or more first indicators representing planting and harvesting datasets that do not have a geo-location error value above a specified threshold;
    one or more second indicators representing planting and harvesting datasets that have a geo-location error value above the specified threshold; and
    wherein the one or more first indicators and the one or more second indicators are displayed using one of a color-coded symbol or a numerical value.

4. The computer-implemented method of claim 1, wherein generating planting datasets and harvesting datasets from the planting data values and harvesting data values, comprises:
    aggregating sets of planting data values based on corresponding timestamps to generate the planting datasets, wherein timestamps of consecutive planting data values of the sets of planting data values are within a first temporal threshold value;
    normalizing the sets of planting data values of the planting datasets by applying at least one of a heading direction rotation adjustment, a geo-location shift adjustment, and applying measurable unit values;
    assigning unique planting pass identifiers to each of the planting datasets;
    aggregating sets of harvesting data values based on corresponding timestamps to generate the harvesting datasets, wherein timestamps of consecutive harvesting data values of the sets of harvesting data values are within a second temporal threshold value;
    normalizing the sets of harvesting data values of the harvesting datasets by applying at least one of a heading direction rotation adjustment, a geo-location shift adjustment, and applying measurable unit values; and
    assigning unique harvesting pass identifiers to each of the harvesting datasets.

5. The computer-implemented method of claim 4, wherein determining the dataset of planting-to-harvesting pairs between the planting datasets and the harvesting datasets, comprises:
    for each harvesting dataset of the harvesting datasets:
    determining a nearest planting dataset to the harvesting dataset based upon associated geo-locations of corresponding planting data values in the nearest planting dataset and associated geo-locations of corresponding harvesting data values in the harvesting dataset;
    generating a planting-to-harvesting pair by assigning the planting pass identifier of the nearest planting dataset to the harvesting dataset;
    aggregating the planting-to-harvesting pairs to generate the dataset of planting-to-harvesting pairs.

6. The computer-implemented method of claim 1, wherein determining the geo-location error values for each planting-to-harvesting pairs of the dataset of planting-to-harvesting pairs, comprises, for each of the planting-to-harvesting pairs of the dataset of planting-to-harvesting pairs:
  determining a first distance between a planting dataset and a harvesting dataset as a first unit vector that is parallel to the direction of the harvesting datasets;
  determining a second distance between the planting dataset and the harvesting dataset as a second unit vector that is perpendicular to the direction of the harvesting datasets;
  calculating a perpendicular distance as a sum of the first unit vector and the second unit vector; and
  determining the geo-location error value as a length of overlap of the harvesting dataset with the planting dataset as one minus a sum of the perpendicular distance and a width of the harvesting dataset divided by two, minus a width of the planting dataset divided by two.

7. The computer-implemented method of claim 1, wherein generating planting datasets and harvesting datasets from the planting data values and harvesting data values, comprises:
  aggregating planting data values that have geo-location coordinates that are within a first proximity to each other and have same timestamp values to generate the planting datasets, wherein the first proximity is based upon a width of a planter;
  determining centroid locations for each planting dataset of the planting datasets by determining a planting centroid geo-location for corresponding planting data values that make up each of the planting datasets;
  aggregating harvesting data values that have geo-location coordinates that are within a second proximity to each other and have same timestamp values, wherein the second proximity is based upon a width of a harvester; and
  determining centroid locations for each harvesting dataset of the harvesting datasets by determining a harvesting centroid geo-location for corresponding harvesting data values that make up each of the harvesting datasets.

8. The computer-implemented method of claim 7, wherein determining the dataset of planting-to-harvesting pairs between the planting datasets and the harvesting datasets, comprises:
  mapping each of the planting datasets within a multi-dimensional space based upon the centroid locations associated with each of the planting datasets;
  for each harvesting dataset of the harvesting datasets:
  determining a distance value between nearest centroid locations of a planting dataset of the planting datasets and the corresponding harvesting dataset;
  determining whether the distance value is below a tolerance threshold;
  upon determining that the distance value is below the tolerance threshold, generating a planting-to-harvesting pair between the nearest planting dataset and the corresponding harvesting dataset; and
  aggregating the planting-to-harvesting pairs to generate the dataset of planting-to-harvesting pairs.

9. The computer-implemented method of claim 1, wherein determining the geo-location error values for each planting-to-harvesting pairs of the dataset of planting-to-harvesting pairs, comprises, for each of the planting-to-harvesting pairs of the dataset of planting-to-harvesting pairs:
  determining a first distance between a planting dataset and a harvesting dataset as a first unit vector that is parallel to a direction of the harvesting datasets;
  determining a second distance between the planting dataset and the harvesting dataset as a second unit vector that is perpendicular to the direction of the harvesting datasets;
  calculating a perpendicular distance as a sum of the first unit vector and the second unit vector; and
  determining the geo-location error value as a percentage of overlap of the harvesting dataset with the planting dataset as one minus a sum of the perpendicular distance and a width of the harvesting dataset divided by two, minus a width of the planting dataset divided by two, divided by the width of the harvesting dataset.

10. The computer-implemented method of claim 1, wherein determining the geo-location error values for each of the dataset of planting-to-harvesting pairs comprises for every nth planting-to-harvesting pair of the dataset of planting-to-harvesting pairs, determining geo-location offset values between geo-locations of a planting dataset and a corresponding particular harvesting dataset.

11. A system comprising:
  one or more processors;
  a memory storing instructions which, when executed by the one or more processors, cause performance of:
  receiving agricultural data records comprising a plurality of planting data values and a plurality of harvesting data values, wherein the plurality of planting data values comprises planting geo-location coordinates and corresponding timestamps and the plurality of harvesting data values comprises harvesting geo-location coordinates and a corresponding timestamps;
  generating a plurality of planting datasets by aggregating planting data values, of the plurality of planting data values, based on at least one of planting geo-location coordinates and timestamps, and generating a plurality of harvesting datasets by aggregating harvesting data values, of the plurality of harvesting data values, based on at least one of harvesting geo-location coordinates and timestamps;
  determining a dataset of planting-to-harvesting pairs that represent matching pairs of planting datasets to corresponding harvesting datasets based upon proximities between geo-location coordinates of planting datasets and geo-location coordinates of harvesting datasets;
  determining geo-location error values for each of the dataset of planting-to-harvesting pairs by determining geo-location offset values between geo-locations of each planting dataset and each corresponding particular harvesting dataset;
  based on the determined geo-location error values, correcting shifts caused by the geo-location error values by adjusting one or more geo-location coordinates for each of the dataset of planting-to-harvesting pairs; and
  based on the adjusted one or more geo-location coordinates, performing one or more real-time adjustments of a direction of an agricultural equipment during treatment of one or more fields.

12. The system of claim 11, wherein the instructions, when executed by the one or more processors, further cause performance of:
  determining an overall field quality value for a field of the one or more fields by computing a sum of the geo-location error values and dividing the sum by a field specific error threshold value; and presenting the overall field quality value on a display screen of a client computer.

13. The system of claim 11, wherein the instructions, when executed by the one or more processors, further cause performance of:
generating a graphical representation of a field with the geo-location error values, the graphical representation comprising:
one or more first indicators representing planting and harvesting datasets that do not have a geo-location error value above a specified threshold;
one or more second indicators representing planting and harvesting datasets that have a geo-location error value above the specified threshold; and
wherein the one or more first indicators and the one or more second indicators are displayed using one of a color-coded symbol or a numerical value.

14. The system of claim 11, wherein generating planting datasets and harvesting datasets from the planting data values and harvesting data values, comprises:
aggregating sets of planting data values based on corresponding timestamps to generate the planting datasets, wherein timestamps of consecutive planting data values of the sets of planting data values are within a first temporal threshold value;
normalizing the sets of planting data values of the planting datasets by applying at least one of a heading direction rotation adjustment, a geo-location shift adjustment, and applying measurable unit values;
assigning unique planting pass identifiers to each of the planting datasets;
aggregating sets of harvesting data values based on corresponding timestamps to generate the harvesting datasets, wherein timestamps of consecutive harvesting data values of the sets of harvesting data values are within a second temporal threshold value;
normalizing the sets of harvesting data values of the harvesting datasets by applying at least one of a heading direction rotation adjustment, a geo-location shift adjustment, and applying measurable unit values; and
assigning unique harvesting pass identifiers to each of the harvesting datasets.

15. The system of claim 14, wherein determining the dataset of planting-to-harvesting pairs between the planting datasets and the harvesting datasets, comprises:
for each harvesting dataset of the harvesting datasets:
determining a nearest planting dataset to the harvesting dataset based upon associated geo-locations of corresponding planting data values in the nearest planting dataset and associated geo-locations of corresponding harvesting data values in the harvesting dataset;
generating a planting-to-harvesting pair by assigning the planting pass identifier of the nearest planting dataset to the harvesting dataset;
aggregating the planting-to-harvesting pairs to generate the dataset of planting-to-harvesting pairs.

16. The system of claim 11, wherein determining the geo-location error values for each planting-to-harvesting pairs of the dataset of planting-to-harvesting pairs, comprises, for each of the planting-to-harvesting pairs of the dataset of planting-to-harvesting pairs:
determining a first distance between a planting dataset and a harvesting dataset as a first unit vector that is parallel to the direction of the harvesting datasets;
determining a second distance between the planting dataset and the harvesting dataset as a second unit vector that is perpendicular to the direction of the harvesting datasets;
calculating a perpendicular distance as a sum of the first unit vector and the second unit vector; and
determining the geo-location error value as a length of overlap of the harvesting dataset with the planting dataset as one minus a sum of the perpendicular distance and a width of the harvesting dataset divided by two, minus a width of the planting dataset divided by two.

17. The system of claim 11, wherein generating planting datasets and harvesting datasets from the planting data values and harvesting data values, comprises:
aggregating planting data values that have geo-location coordinates that are within a first proximity to each other and have same timestamp values to generate the planting datasets, wherein the first proximity is based upon a width of a planter;
determining centroid locations for each planting dataset of the planting datasets by determining a planting centroid geo-location for corresponding planting data values that make up each of the planting datasets;
aggregating harvesting data values that have geo-location coordinates that are within a second proximity to each other and have same timestamp values, wherein the second proximity is based upon a width of a harvester; and
determining centroid locations for each harvesting dataset of the harvesting datasets by determining a harvesting centroid geo-location for corresponding harvesting data values that make up each of the harvesting datasets.

18. The system of claim 17, wherein determining the dataset of planting-to-harvesting pairs between the planting datasets and the harvesting datasets, comprises:
mapping each of the planting datasets within a multi-dimensional space based upon the centroid locations associated with each of the planting datasets;
for each harvesting dataset of the harvesting datasets:
determining a distance value between nearest centroid locations of a planting dataset of the planting datasets and the corresponding harvesting dataset;
determining whether the distance value is below a tolerance threshold;
upon determining that the distance value is below the tolerance threshold, generating a planting-to-harvesting pair between the nearest planting dataset and the corresponding harvesting dataset; and
aggregating the planting-to-harvesting pairs to generate the dataset of planting-to-harvesting pairs.

19. The system of claim 11, wherein determining the geo-location error values for each planting-to-harvesting pairs of the dataset of planting-to-harvesting pairs, comprises, for each of the planting-to-harvesting pairs of the dataset of planting-to-harvesting pairs:
determining a first distance between a planting dataset and a harvesting dataset as a first unit vector that is parallel to a direction of the harvesting datasets;
determining a second distance between the planting dataset and the harvesting dataset as a second unit vector that is perpendicular to the direction of the harvesting datasets;
calculating a perpendicular distance as a sum of the first unit vector and the second unit vector; and
determining the geo-location error value as a percentage of overlap of the harvesting dataset with the planting dataset as one minus a sum of the perpendicular distance and a width of the harvesting dataset divided by two, minus a width of the planting dataset divided by two, divided by the width of the harvesting dataset.

20. The system of claim 11, wherein determining the geo-location error values for each of the dataset of planting-to-harvesting pairs comprises for every nth planting-to-harvesting pair of the dataset of planting-to-harvesting pairs, determining geo-location offset values between geo-locations of a planting dataset and a corresponding particular harvesting dataset.

21. One or more non-transitory computer readable media storing instructions which, when executed by one or more processors, cause performance of:
receiving agricultural data records comprising a plurality of planting data values and a plurality of harvesting data values, wherein the plurality of planting data values comprises planting geo-location coordinates and corresponding timestamps and the plurality of harvesting data values comprises harvesting geo-location coordinates and a corresponding timestamps;
generating a plurality of planting datasets by aggregating planting data values, of the plurality of planting data values, based on at least one of planting geo-location coordinates and timestamps, and generating a plurality of harvesting datasets by aggregating harvesting data values, of the plurality of harvesting data values, based on at least one of harvesting geo-location coordinates and timestamps;
determining a dataset of planting-to-harvesting pairs that represent matching pairs of planting datasets to corresponding harvesting datasets based upon proximities between geo-location coordinates of planting datasets and geo-location coordinates of harvesting datasets;
determining geo-location error values for each of the dataset of planting-to-harvesting pairs by determining geo-location offset values between geo-locations of each planting dataset and each corresponding particular harvesting dataset;
based on the determined geo-location error values, correcting shifts caused by the geo-location error values by adjusting one or more geo-location coordinates for each of the dataset of planting-to-harvesting pairs; and
based on the adjusted one or more geo-location coordinates, performing one or more real-time adjustments of a direction of an agricultural equipment during treatment of one or more fields.

* * * * *